(12) United States Patent
Bowden et al.

(10) Patent No.: US 11,174,192 B2
(45) Date of Patent: Nov. 16, 2021

(54) METHODS AND GLASS MANUFACTURING SYSTEM FOR IMPACTING COMPACTION IN A GLASS SHEET (71) Applicant: CORNING INCORPORATED, Corning, NY (US)

(72) Inventors: Bradley Frederick Bowden, Corning, NY (US); Douglas Benjamin Rapp, Danville, KY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/515,680

(22) PCT Filed: Sep. 25, 2015

(86) PCT No.: PCT/US2015/052127
§ 371 (c)(1),
(2) Date: Mar. 30, 2017

(87) PCT Pub. No.: WO2016/053775
PCT Pub. Date: Apr. 7, 2016

(65) Prior Publication Data
US 2017/0297948 A1 Oct. 19, 2017

Related U.S. Application Data

(60) Provisional application No. 62/057,372, filed on Sep. 30, 2014.

(51) Int. Cl.
*C03B 1/00* (2006.01)
*C03C 3/093* (2006.01)
(Continued)

(52) U.S. Cl.
CPC ............... *C03C 3/093* (2013.01); *C03B 1/00* (2013.01); *C03B 5/16* (2013.01); *C03C 1/006* (2013.01); *C03C 3/091* (2013.01); *C03C 2203/10* (2013.01)

(58) Field of Classification Search
CPC ......................................................... C03B 1/00
See application file for complete search history.

(56) References Cited

U.S. PATENT DOCUMENTS 3,338,696 A    8/1967   Dockerty
3,682,609 A    8/1972   Dockerty
(Continued)

FOREIGN PATENT DOCUMENTS

CN    101511742 A    8/2009
CN    103987666 A    8/2014

OTHER PUBLICATIONS

Birtch et al. "Effect of water in the melting atmosphere on the transformation temperature of commerical glasses" Ceramic Transactions: Advances in Fusion and Processing Glass III, vol. 141, 2004. pp. 347-354.
(Continued)

*Primary Examiner* — John M Hoffmann
(74) *Attorney, Agent, or Firm* — Ryan T. Hardee (57) ABSTRACT

Methods and a glass manufacturing system are described herein that impact compaction in a glass sheet. For instance, a method is described herein for impacting compaction in a glass sheet made by a glass manufacturing system. In addition, a glass manufacturing system is described herein which manufactures a glass sheet that meets a compaction target. Plus, a method is described herein for maintaining an uniform compaction between glass sheets made by different glass manufacturing systems.

11 Claims, 5 Drawing Sheets

(51) Int. Cl.
*C03C 1/00* (2006.01)
*C03C 3/091* (2006.01)
*C03B 5/16* (2006.01)

(56) References Cited

U.S. PATENT DOCUMENTS

| | | | |
|---|---|---|---|
| 3,753,674 A * | 8/1973 | Ohlberg | C03B 27/00 65/114 |
| 4,074,989 A * | 2/1978 | Brzozowski | C03C 13/00 65/27 |
| 4,915,853 A * | 4/1990 | Yamaguchi | A62D 1/0014 169/46 |
| 6,128,924 A | 10/2000 | Bange et al. | |
| 6,230,521 B1 * | 5/2001 | Lehman | C03C 1/002 428/34.4 |
| 9,598,307 B2 | 3/2017 | Miwa et al. | |
| 2005/0191235 A1 * | 9/2005 | Vajo | C01B 3/065 423/657 |
| 2009/0286091 A1 | 11/2009 | Danielson et al. | |
| 2013/0029830 A1 * | 1/2013 | Koyama | C03C 3/091 501/67 |
| 2014/0038807 A1 | 2/2014 | Tsujimura et al. | |
| 2014/0179510 A1 | 6/2014 | Allan et al. | |
| 2014/0287905 A1 | 9/2014 | Tokunaga et al. | |
| 2017/0287905 A1 | 10/2017 | Morrow et al. | |

OTHER PUBLICATIONS

Jewell et al. "Effect of water concentration on the properties of commercial soda-lime-silica glasses" J. Am. Ceram. Soc. vol. 73, 1990. pp. 132-135.

Otto, "Compaction effects on glass fibers" Journal of the American Ceramic Society, 4(2) 1961, pp. 68-72.

Chinese Patent Application No. 201580065075.0; Office Action dated Dec. 18, 2020; 20 Pages; Chinese Patent Office.

* cited by examiner

METHODS AND GLASS MANUFACTURING SYSTEM FOR IMPACTING COMPACTION IN A GLASS SHEET

CROSS-REFERENCE TO RELATED APPLICATIONS

This application claims the benefit of priority under 35 U.S.C. § 371 of International Patent Application Serial No. PCT/US15/52127, filed on Sep. 25, 2015, which in turn, claims the benefit of priority of U.S. Provisional Patent Application Ser. No. 62/057,372 filed on Sep. 30, 2014, the contents of each of which are relied upon and incorporated herein by reference in their entireties.

BACKGROUND

Corning Incorporated developed a process known as the fusion process to form high quality thin glass sheets that can be used in a variety of devices like flat panel displays. The fusion process is an exemplary technique for producing glass sheets used in flat panel displays because this process produces glass sheets whose surfaces have superior flatness and smoothness when compared to glass sheets produced by other methods. The fusion process was first described in U.S. Pat. Nos. 3,338,696 and 3,682,609, the contents of which are incorporated herein by reference. Since the development of the fusion process, Corning has consistently improved the glass manufacturing system and the associated glass manufacturing process. Improvements to the glass manufacturing system and the associated glass manufacturing process are the subject of the present disclosure.

SUMMARY

The present disclosure relates in general to the glass manufacturing field and also to a method for impacting compaction in a glass sheet made by a glass manufacturing system, a glass manufacturing system which manufactures a glass sheet that meets a compaction target, and a method for maintaining compaction uniformity between glass sheets made by different glass manufacturing systems.

Methods and a glass manufacturing system are also described in the independent claims of the present application. Advantageous embodiments of the methods and glass manufacturing system are described in the dependent claims.

Some embodiments provide a method for impacting compaction in a glass sheet made by a glass manufacturing system. The method comprises a step of selecting batch materials used to make the glass sheet to control a beta-OH of the glass sheet to meet a compaction target in the glass sheet. For instance, the selecting step may further comprise one or more of the following: (a) selecting a $B_2O_3$ source for use in the batch materials, wherein the $B_2O_3$ source comprises: (1) a predetermined amount, if any, of a first $B_2O_3$ material having a dry physical characteristic which lowers the beta-OH of the glass sheet; and (2) a predetermined amount, if any, of a second $B_2O_3$ material having a wet physical characteristic which increases the beta-OH of the glass sheet; (b) selecting a $SiO_2$ source for use in the batch materials to control the beta-OH of the glass sheet; (c) selecting a hydrated mineral for use in the batch materials to control the beta-OH of the glass sheet; and (d) adding, removing or changing an amount of a halide to or from the batch materials to control the beta-OH of the glass sheet.

Other embodiments provide a glass manufacturing system which manufactures a glass sheet that meets a compaction target. The glass manufacturing system comprising: (1) a melting vessel for melting batch materials to form molten glass; (2) one or more vessels for processing the molten glass; (3) a forming apparatus for receiving the processed molten glass and forming the glass sheet; and (4) wherein the batch materials are selected to control a beta-OH of the glass sheet to meet the compaction target in the glass sheet.

In yet further embodiments a method is provided for maintaining compaction uniformity between glass sheets made by different glass manufacturing systems. The method comprising the steps of: (1) determining a compaction for the glass sheet made by each one of the different glass manufacturing systems; (2) determining compaction differences between the glass sheets made by the different glass manufacturing systems; (3) determining a common compaction target for the glass sheets to be made by the different glass manufacturing systems. Then, with respect to each one of the glass manufacturing systems perform the following: (a) determining if the compaction of the glass sheet made by one glass manufacturing system meets the common compaction target; (b) if yes, then no change is made to batch materials used to make the glass sheet by the one glass manufacturing system; (c) if no, then determining if the compaction of the glass sheet made by the one glass manufacturing system is high or low with respect to the common compaction target; (d) if high, then (i) changing batch materials used to make the glass sheet to have a lower beta-OH, (ii) determining a compaction for a glass sheet made with the changed batch materials by the one glass manufacturing system, and (iii) returning to step (a) of determining if the compaction of the glass sheet made by the one glass manufacturing system meets the common compaction target; and (e) if low, then (i) changing batch materials used to make the glass sheet to have a higher beta-OH, (ii) determining a compaction for a glass sheet made with the changed batch materials by the one glass manufacturing system, and (iii) returning to step (a) of determining if the compaction of the glass sheet made by the one glass manufacturing system meets the common compaction target.

Some embodiments provide a glass production method. The method may include selecting a first quantity of raw materials. The first quantity of raw materials include an anhydrous boric acid and a boric acid. The first quantity of raw materials define a first ratio of the anhydrous boric acid to the boric acid. The method may also include producing a first quantity of molten glass by melting the first quantity of raw materials in a vessel and producing a first glass sheet from the first quantity of molten glass. The method may also include comparing a measured compaction of the first glass sheet with a compaction target and determining, based on the measured compaction comparison and based on the first ratio, a second ratio of the anhydrous boric acid to the boric acid for a second quantity of raw materials. The second ratio is different than the first ratio. The method may also include producing a second quantity of molten glass by melting the second quantity of raw materials in the vessel. The second quantity of raw materials includes the anhydrous boric acid and the boric acid. The second quantity of raw materials defines the determined second ratio of the anhydrous boric acid to the boric acid. The method may also include producing a second glass sheet from the second quantity of molten glass.

In one aspect, the compaction can be measured using an annealing point, such that the second ratio is determined based on a comparison of a measured annealing point of the first glass sheet and a desired annealing point of the first glass sheet.

In another aspect, the method may also include continuously producing molten glass by continuously supplying the anhydrous boric acid and the boric acid to the vessel, continuously producing glass sheets from the molten glass, and actively controlling a compaction of the glass sheets by continuously varying a ratio of the supplied anhydrous boric acid to the supplied boric acid.

In another aspect, the method may also include continuously varying the ratio of the supplied anhydrous boric acid to the supplied boric acid based on measured annealing points of the glass sheets.

In another aspect, the method may include determining the second ratio based on a magnitude of disparity between the measured compaction and the compaction target.

In another aspect, the first and second quantities of raw materials each include a dry silicon dioxide and a wet silicon dioxide. The first quantity of raw materials defines a third ratio of the dry silicon dioxide to the wet silicon dioxide. The dry silicon dioxide has a lower water content than the wet silicon dioxide.

In another aspect, the method may include determining, based on the compaction comparison and based on the third ratio, a fourth ratio of the dry silicon dioxide to the wet silicon dioxide. The second quantity of raw materials includes the dry and the wet silicon dioxides and defines the fourth ratio of the dry silicon dioxide to the wet silicon dioxide.

In another aspect, a controller includes one or more processors that is configured to compare the measured compaction of the first glass sheet with the compaction target and determine the second ratio based on the compaction comparison and the first ratio. The method may also include using the controller to compare the measured compaction of the first glass sheet with the compaction target and using the controller to determine the second ratio based on the compaction comparison and the first ratio.

In another aspect, the method may include continuously producing molten glass by continuously supplying the anhydrous boric acid and the boric acid to the vessel, continuously producing glass sheets from the molten glass, and using a controller that includes one or more processors to actively control a compaction of the glass sheets by continuously varying a ratio of the supplied anhydrous boric acid to the supplied boric acid.

In another aspect, the compaction is measured using an annealing point.

In another aspect, the controller is configured to determine a first water content of the first quantity of molten glass, and determine the second ratio of the anhydrous boric acid to the boric acid based on the first water content, the measured compaction of the first glass sheet, the compaction target, and the first ratio of the anhydrous boric acid to the boric acid.

Additional features and advantages of the disclosure will be set forth, in part, in the detailed description, figures and any claims which follow, and in part will be derived from the detailed description, or can be learned by practice of the methods as described herein.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals were possible and in which.

DETAILED DESCRIPTION

Figure 1:
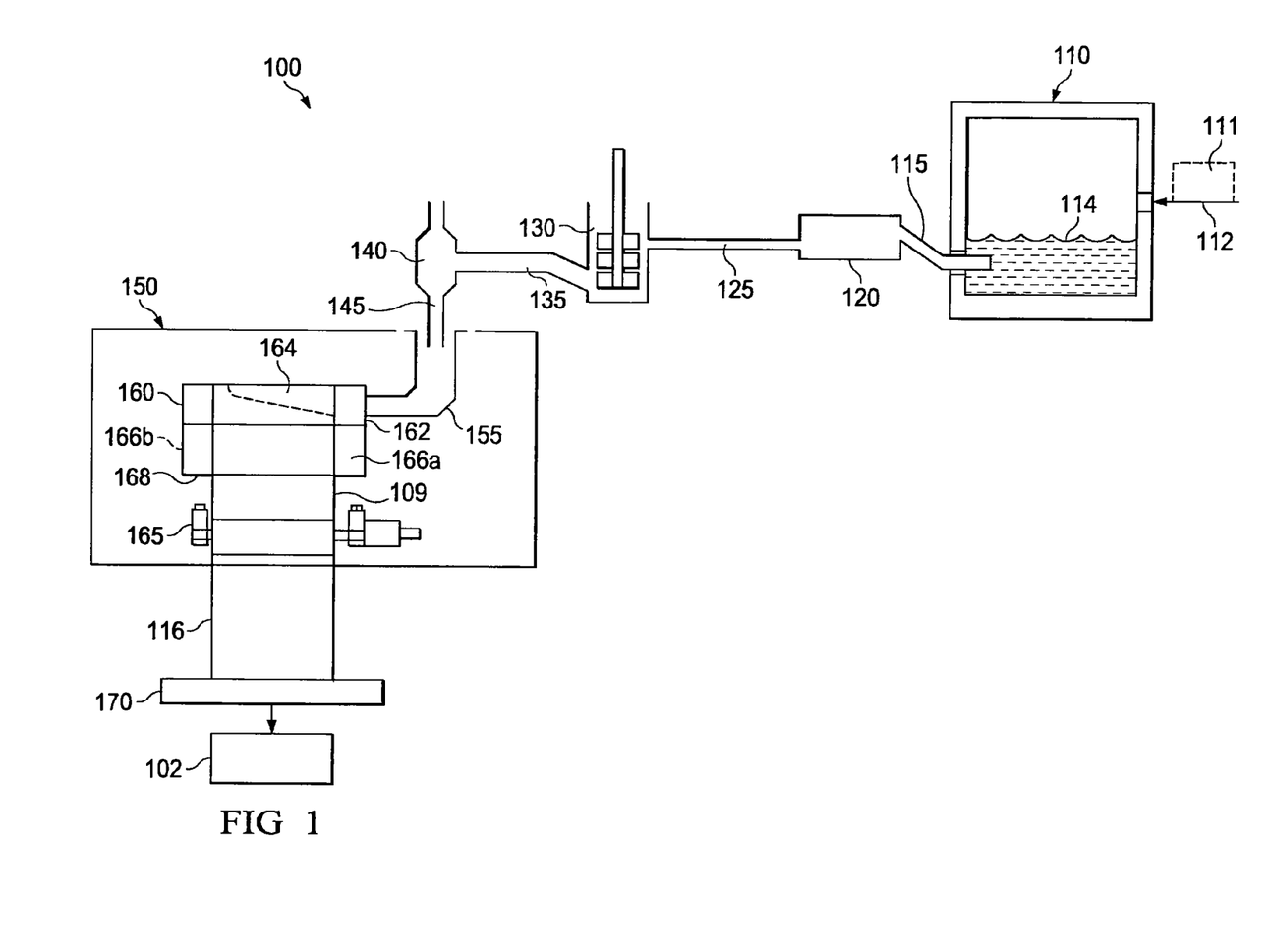
FIG. 1 is a schematic view of an exemplary glass manufacturing system which uses a fusion draw process to manufacture a glass sheet.

Referring to FIG. 1, a schematic view of an exemplary glass manufacturing system 100 is shown which uses a fusion draw process to manufacture a glass sheet 102 in accordance with some embodiments of the present disclosure. The glass manufacturing system 100 includes a melting vessel 110, a melting to fining tube 115, a fining vessel 120, a finer to stir chamber tube 125, a stir chamber 130 (e.g., mixing vessel 130), a stir chamber to bowl connecting tube 135, a bowl 140 (e.g., delivery vessel 140), a downcomer 145, a fusion draw machine (FDM) 150 (which includes an inlet tube 155, a forming apparatus 160, and a pull roll assembly 165), and a traveling anvil machine (TAM) 170. The glass manufacturing vessels 115, 120, 125, 130, 135, 140, 145 and 155 can be made from platinum or platinum-containing metals such as platinum-rhodium, platinum-iridium and combinations thereof, but they may also comprise other refractory metals such as palladium, rhenium, ruthenium, and osmium, or alloys thereof. The forming apparatus 160 (e.g., isopipe 160) can be made from a ceramic material or glass-ceramic refractory material.

The melting vessel 110 is where glass batch materials 111 are introduced as shown by arrow 112 and melted to form molten glass 114 (i.e., first quantity or second quantity of molten glass). The fining vessel 120 (e.g., finer tube 120) is connected to the melting vessel 110 by the melting to fining tube 115. The fining vessel 120 has a high temperature processing area that receives the molten glass 114 (not shown at this point) from the melting vessel 110 and in which bubbles are removed from the molten glass 114. The fining vessel 120 is connected to the stir chamber 130 by the finer to stir chamber connecting tube 125. The stir chamber 130 is connected to the bowl 140 by the stir chamber to bowl connecting tube 135. The bowl 140 delivers the molten glass 114 (not shown) through the downcomer 145 into the FDM 150.

The FDM 150 includes the inlet tube 155, the forming vessel 160 (e.g., isopipe 160), and the pull roll assembly 165. The inlet tube 155 receives the molten glass 114 (not shown) from the downcomer 145 and from the inlet tube 155 the molten glass 114 (not shown) then flows to the forming vessel 160. The forming vessel 160 includes an opening 162 that receives the molten glass 114 (not shown) which flows into a trough 164 and then overflows and runs down two opposing sides 166a and 166b before fusing together at a root 168 to form a glass sheet 109. The pull roll assembly 165 receives the glass sheet 109 and outputs a drawn glass sheet 116. The TAM 170 receives the drawn glass sheet 116 and separates the drawn glass sheet 116 into individual glass sheets 102.

As will be described in detail hereinafter, some embodiments use a raw material 111 (batch material 111) selection to directionally control the water content (beta-OH) of the glass sheet 102 and impact compaction characteristics of the glass sheet 102. In this discussion, beta-OH is defined as an expression of the water content of a glass sample as measured using standard Fourier Transform Infrared (FTIR) spectroscopy techniques. Further, compaction is generally defined as the densification of a glass that occurs as its molecular structure relaxes from its initial state towards a higher density equilibrium state. In particular, it was unexpectedly discovered that the water content (beta-OH) can have an inverse relationship with the properties of a glass composition 111 (batch material 111) that directly impacts the compaction characteristics of the glass sheet 102. For example, wetter raw materials 111 can increase beta-OH, while drier raw materials 111 can decrease beta-OH. Furthermore, for a given glass composition 111 (batch materials 111) used to produce glass sheets 102 in the fusion process, the compaction performance can also be impacted by flow where increased flow results in greater compaction. The use of drier materials can offset this difference, enabling higher flow draws to have similar compaction as lower flow draws. In some embodiments, the raw material 111 that can impact the beta-OH and compaction include, but are not limited to, an $SiO_2$ source, a $B_2O_3$ source, and hydrated minerals, to name a few. In other embodiments, the addition of halides to the batch materials 111 can have a drying effect. In further embodiments, the $B_2O_3$ source can have a large effect on beta-OH in display glass compositions 111. The terminology of raw materials 111, batch materials 111, and glass composition 111 are used interchangeably herein and should not limit the scope of the claims appended herewith.

Figure 2:
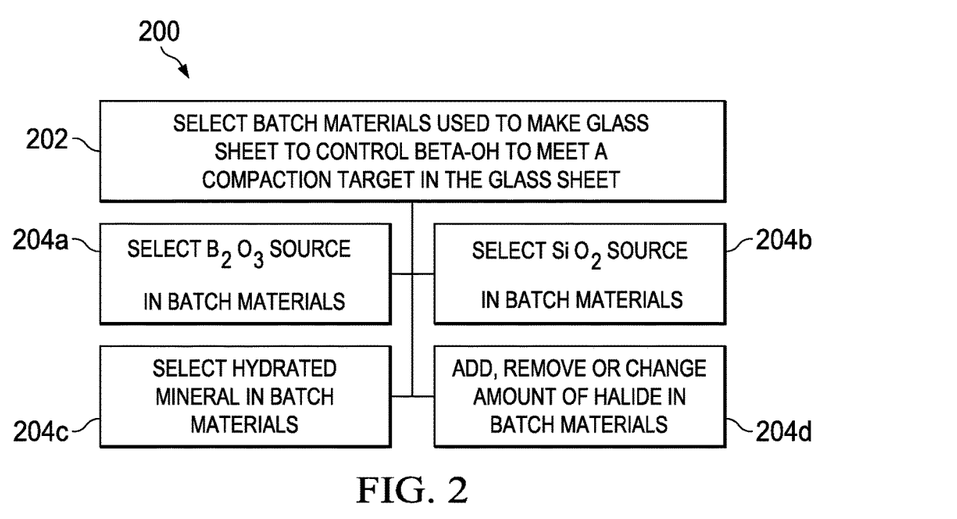
FIG. 2 is a flowchart illustrating an exemplary method for impacting compaction in the glass sheet.

Referring to FIG. 2, a flowchart illustrating an exemplary method 200 for impacting compaction in the glass sheet 102 is provided. The method 200 comprises a step 202 of selecting the batch materials 111 for selecting a first quantity or second quantity of raw materials). These batch materials 111 can be used to make the glass sheet 102 (i.e., a first or second glass sheet) and to control a beta-OH of the glass sheet 102 to meet a compaction target. The selecting step 202 can also include selecting a $B_2O_3$ source for use in the batch materials 111, where the $B_2O_3$ source comprises a predetermined amount, if any, of a first $B_2O_3$ material (e.g., anhydrous boric acid) having a dry physical characteristic which lowers the beta-OH of the glass sheet and a predetermined amount, if any, of a second $B_2O_3$ material (e.g., boric acid) having a wet physical characteristic which increases the beta-OH of the glass sheet (step 204a). In some embodiments, the selecting step 202 can further include selecting an $SiO_2$ source for use in the batch materials 111 to control the beta-OH of the glass sheet 102 (step 204b). In additional embodiments, the $SiO_2$ source can be the same or different (e.g., particle size, composition, water content, and/or other characteristics). In some embodiments, the selecting step 202 can include selecting a hydrated mineral for use in the batch materials 111 to control the beta-OH of the glass sheet 102 (step 204c). In one example, the hydrated mineral can be added, removed or have its amount changed in the batch materials 111 to control the beta-OH of the glass sheet 102. In some embodiments, the selecting step 202 can also include adding, removing or changing an amount of a halide to or from the batch materials 111 to control the beta-OH of the glass sheet 102 (step 204d). The compaction target can be, but is not limited to a softening point, an anneal point (i.e., a desired annealing point), a strain, a glass transition temperature (Tg), and combinations thereof, just to name a few physical characteristics. In some embodiments, the compaction target is a strain. However, if the nominal glass composition and manufacturing process conditions are held constant a correlation between the compaction and other physical properties such as the softening point, the annealing point, the strain point, and the Tg can be established enabling their use as surrogate measurements for compaction. Of course, these physical characteristics should not limit the scope of the claims appended herewith as embodiments described herein can employ any number of characteristics to define a compaction target. It should be appreciated that a controller (processor/memory) and other types of equipment (e.g., testing equipment) may be used to determine the compaction of the glass sheet 102, determine a compaction target for the glass sheet 102, and select the batch materials 111 per steps 202, 204a, 204b, 204c and 204d which are used to make the glass sheet 102.

As noted above, the embodiments and the functional operations described herein can be implemented in digital electronic circuitry, or in computer software, firmware, or hardware, including the structures disclosed in this specification and their structural equivalents, or in combinations of one or more of them. Embodiments described herein can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine readable storage substrate, a memory device, or a combination of one or more of them.

The term "processor" or "controller" can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input.

Embodiments described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described herein, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

An exemplary glass composition 111 that could be used in some embodiments is provided in TABLE #1:

TABLE #1

| Oxide (wt. %) | Min | Max |
| --- | --- | --- |
| $SiO_2$ | 59 | 64 |
| $Al_2O_3$ | 17 | 20 |
| $B_2O_3$ | 0 | 11 |
| MgO | 1 | 4 |
| CaO | 4 | 8 |
| SrO | 0 | 4 |
| BaO | 0 | 9 |
| $SnO_2$ | 0 | 1 |
| $Fe_2O_3$ | 0 | 1 |
| $K_2O$ | 0 | 1 |
| $Na_2O$ | 0 | 1 |
| $ZrO_2$ | 0 | 1 |

In some embodiments, an exemplary glass composition 111 can comprise hydrated calcium metaborate (CaO-B2O3-2H2O), colemanite (2CaO-3B2O3-5H2O), to name a few and potentially other naturally hydrated minerals which include water and one or more of the elements of the target oxides for the exemplary composition. In other embodiments, the exemplary glass composition 111 does or could comprise fluoride, chloride, or bromide forms of elements of the target oxides for the exemplary composition. In further embodiments, zinc and phosphorous may be added if desired to an exemplary glass composition 111.

Of course, the claims should not be limited to only the compositions provided in TABLE #1 as it should be appreciated that embodiments can be used with a wide variety of glass compositions 111. For example, TABLE #2 provides another non-limiting exemplary glass composition 111 which can be used in some embodiments.

TABLE #2

| Oxide (wt. %) | Min | Max |
| --- | --- | --- |
| SiO2 | 56 | 66 |
| Al2O3 | 16 | 22 |
| B2O3 | 0 | 12 |
| MgO | 0 | 5 |
| CaO | 0 | 10 |
| SrO | 0 | 5 |
| BaO | 0 | 10 |
| SnO2 | 0 | 1 |
| Fe2O3 | 0 | 0.5 |
| K2O | 0 | 0.1 |
| Na2O | 0 | 0.1 |
| ZrO2 | 0 | 0.5 |

It should also be noted that zinc and phosphorous may be added if desired to the exemplary glass compositions 111 identified in TABLE #2 as well as exemplary hydrated materials listed above.

Figure 3:
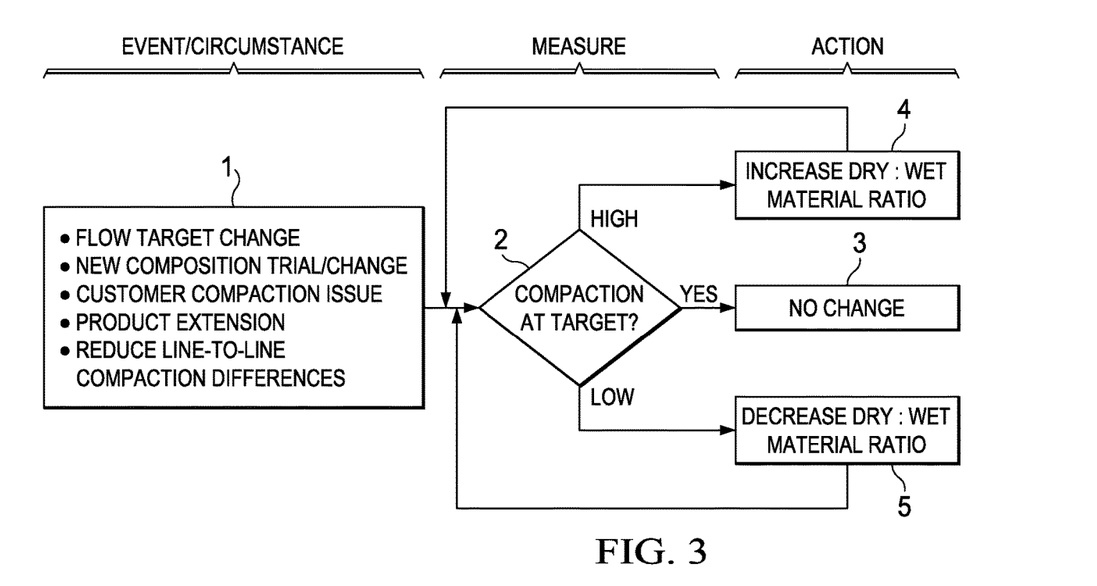
FIG. 3 is a diagram which illustrates exemplary events or circumstances that may be a driver for implementing the method shown in FIG. 2.

Referring to FIG. 3, a diagram is provided illustrating exemplary events or circumstances that may be a driver for implementing exemplary methods 200 to change the batch materials 111 to meet a specific compaction target in the glass sheet 102. Non-limiting drivers can include a flow target change, a glass composition change, customer compaction issues, glass product extension, and a desire to reduce line-to-line compaction issues.

With regard to flow target changes, if one wanted to increase the ultimate flow target for a given fusion draw (given glass manufacturing system 100) for cost reduction purposes, then one would consider a specific compaction target and capability at the higher flow and as a result this would increase the amount of drier materials in the batch materials 111 to reduce compaction to target.

With regard to glass composition changes, a new glass composition trial may seek to employ this methodology in combination with a given draw design and flow target constraint.

With regard to customer compaction issues, customer complaints or customer transparency issues with compaction variability in the glass sheets 102 may exist, either within a specific product line or product line-to-product line, which would merit the use of drier raw materials or adjustments to the dry-to-wet material ratio in the batch materials 111 to effect a reduction in compaction variability.

With regard to glass product extensions, such a methodology could be considered if reducing (or increasing) the compaction was a means to extend the application of an existing product such as, for example, to have a better dimensional stability at higher display fabrication temperatures.

The issue of reducing line-to-line compaction differences in glass sheets 102 made by different glass manufacturing systems is described in further detail below (see FIG. 4).

In some embodiments, a compaction target may be determined or estimated that would enable the addressing of a specific event-circumstance. Upon such a determination, respective glass sheets 102 may be examined or measured to determine if the compaction target has been meet, is too high, or is too low (see box 2) by, for example, comparing a measured compaction (e.g., a measured annealing point) to the compaction target. If the compaction target has been meet then no change in the batch materials 111 would be needed (i.e., the event-circumstance has been satisfied) (box 3). If the compaction of the glass sheet 102 is higher than the compaction target (i.e., a magnitude of disparity) then the batch materials 111 may be changed to make the glass sheet 102 have a lower beta-OH (e.g., increase a second dry-to-wet material ratio relative to the first or initial dry-to-wet material ratio; i.e., determining the second dry-to-wet material ratio), a compaction for the glass sheet 102 made with the changed batch materials 111 may be determined, and/or a determination of whether the compaction of the glass sheet 102 made with the changed batch materials 111 meets a common target compaction (box 4). If the compaction of the glass sheet 102 is lower than the compaction target then the batch materials 111 may be changed to make the glass sheet 102 have a higher beta-OH (e.g., decrease dry-to-wet material ratio or decrease the second ratio relative to the first or initial ratio), a compaction for the glass sheet 102 made with the changed batch materials 111 may be determined, and/or a determination of whether the compaction of the glass sheet 102 made with the changed batch materials 111 meets a common target compaction (box 5).

Figure 4:
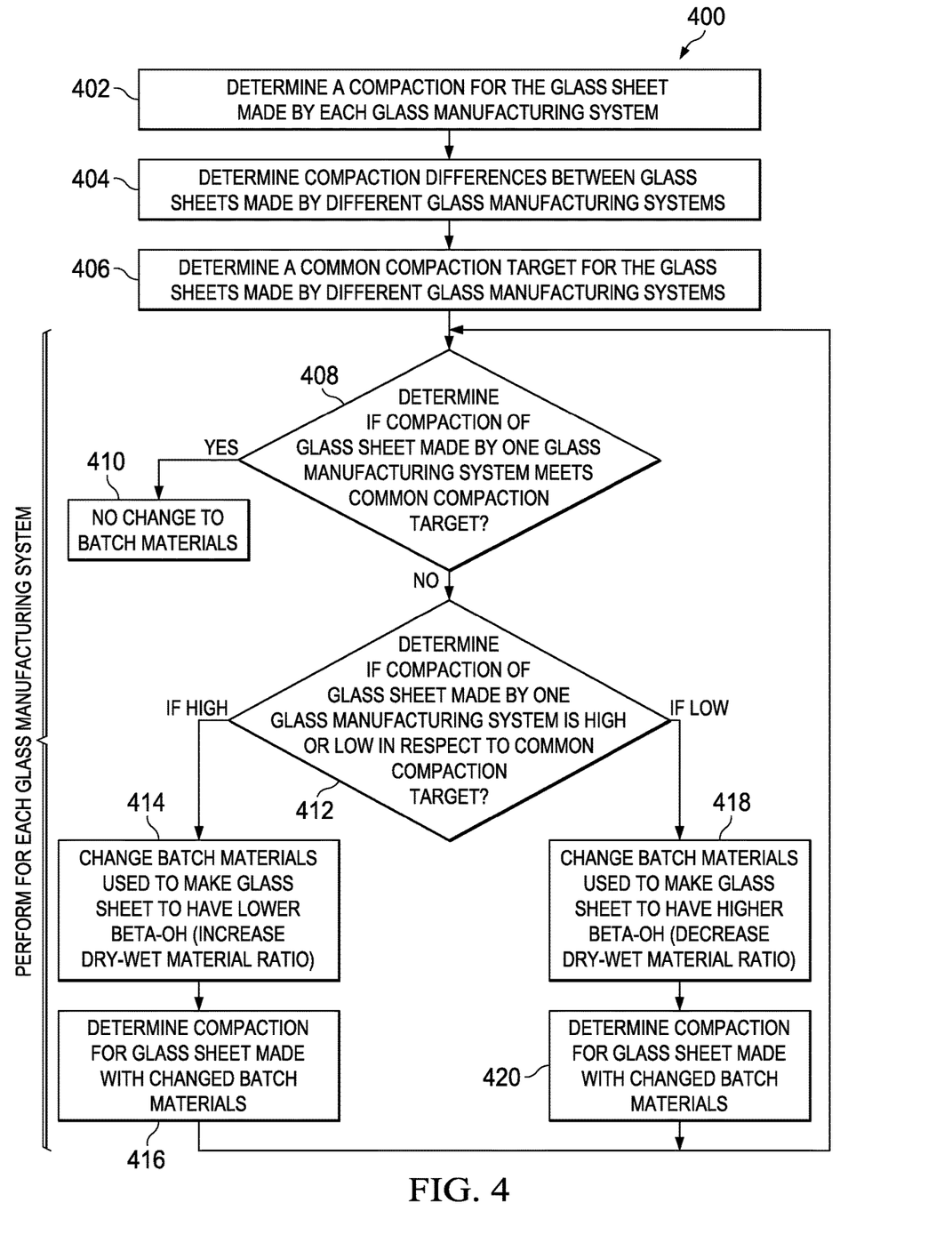
FIG. 4 is a flowchart illustrating an exemplary method for maintaining compaction uniformity between glass sheets made by different glass manufacturing systems.

Referring to FIG. 4, there is a flowchart illustrating an exemplary method 400 for maintaining compaction uniformity between glass sheets 102 made by different glass manufacturing systems 100. Beginning at step 402, compaction can be determined for the glass sheet 102 made by each any one of several different glass manufacturing systems 100. The different glass manufacturing systems 100 may have the same set-ups (e.g., same sized isopipes 160) or different set-ups (e.g., different sized isopipes 160) and may have the same batch materials 111 or different batch materials 111. At step 404, compaction differences can be determined between the glass sheets 102 made by the different glass manufacturing systems 100. At step 406, a common compaction target can be determined for the glass sheets 102 which are to be made by the different glass manufacturing systems 100.

In additional embodiments, at step 408, it may be determined whether the compaction of the glass sheet 102 made by one glass manufacturing system 100 meets the common compaction target. If the result of step 408 is yes, then at step 410 no change is made to the batch materials 111 which are used to make the glass sheet 102 by the one glass manufacturing system 100. If the result of step 408 is no, then at step 412 it may be determined whether the compaction of the glass sheet 102 made by the one glass manufacturing system 100 is high or low with respect to the common compaction target. If the result of step 412 is high, then at step 414 the batch materials 111 may be changed to make the glass sheet 102 have a lower beta-OH (see discussion related to FIG. 2), at step 416 a compaction may be determined for the glass sheet 102 made with the changed batch materials 111 by the one glass manufacturing system 100, and a determination may be made again at step 408 of whether the compaction of the glass sheet 102 made by the one glass manufacturing system 100 now meets the common compaction target. The method may also include at step 414 in which the batch materials 111 are changed to make the glass sheet 102 which has a lower beta-OH, one or more of the following steps changing a $B_2O_3$ source of the batch materials 111 to contain more anhydrous boric acid relative to boric acid or to contain all anhydrous boric acid, changing a $SiO_2$ source of the batch materials to contain a drier $SiO_2$, where the $SiO_2$ source includes one or more types of $SiO_2$ (e.g., fine sand(s), etc.), changing the batch materials 111 to contain a drier hydrated mineral, and/or changing the batch materials 111 to add or increase an amount of a halide.

In some embodiments, if the result of step 408 is low, then at step 418 the batch materials 111 may be changed to make the glass sheet 102 have a higher beta-OH (see discussion related to FIG. 2), at step 420 a compaction determined for the glass sheet 102 made with the changed batch materials 111 by the one glass manufacturing system 100, and a determination may be made again at step 408 of whether the compaction of the glass sheet 102 made by the one glass manufacturing system 100 meets the common compaction target. In additional embodiments, the method may include at step 420 in which the batch materials 111 are changed to make the glass sheet 102 which has a higher beta-OH one or more of the following steps changing a $B_2O_3$ source of the batch materials 111 to contain more boric acid relative to anhydrous boric acid or to contain all boric acid, changing a $SiO_2$ source of the batch materials 111 to contain a wetter $SiO_2$, where the $SiO_2$ source includes one or more types of $SiO_2$ (dry silicon dioxide, wet silicon dioxide, fine sand(s), etc.), changing the batch materials 111 to contain a wetter hydrated mineral, and/or changing the batch materials 111 to reduce or remove an amount if any present of a halide.

Experiments

The following is a discussion regarding various experiments in which specific glass compositions 111 where manipulated to determine an impact on compaction of an exemplary glass sheet 102. As discussed above, some embodiments are generally directed to manipulation of the ratio of dry-to-wet raw materials in glass compositions 111 to control beta-OH and effect a beneficial change in the compaction of a glass sheet 102. One example of this concept involves substituting anhydrous boric oxide, also referred to as anhydrous boric acid (ABA) for all or a portion of the standard boric acid used in the glass composition 111 shown in TABLE #3 in wt. %.

TABLE #3

| Oxide (wt. %) | Min | Max | Example |
|---|---|---|---|
| SiO2 | 56 | 67 | 61.6 |
| Al2O3 | 15 | 21 | 18.1 |
| B2O3 | 1 | 5 | 3.4 |
| MgO | 1 | 5 | 2.8 |
| CaO | 2 | 7 | 4.8 |
| SrO | 0.5 | 3.5 | 1.9 |
| BaO | 5 | 9 | 7.2 |
| SnO2 | 0 | 0.5 | 0.2 |
| Fe2O3 | 0 | 1 | Trace |
| ZrO2 | 0 | 1 | Trace |

Figure 5A:
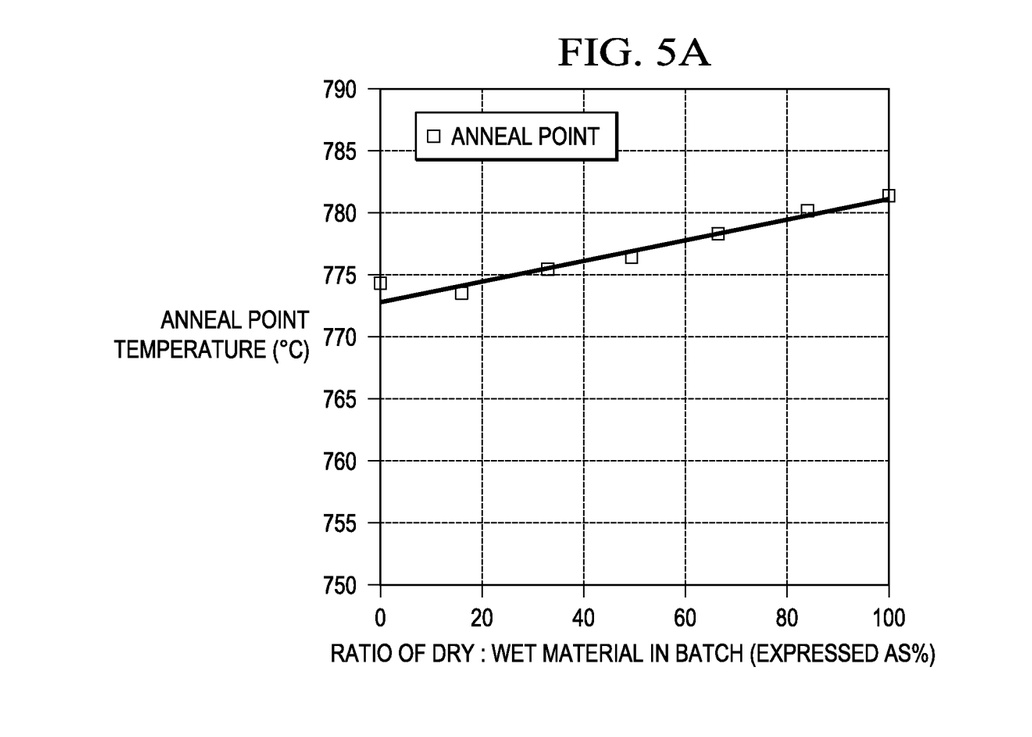
FIGS. 5A-5B are graphs which show experimental effects of changing a dry:wet raw material ratio in an exemplary glass composition.
Figure 5B:
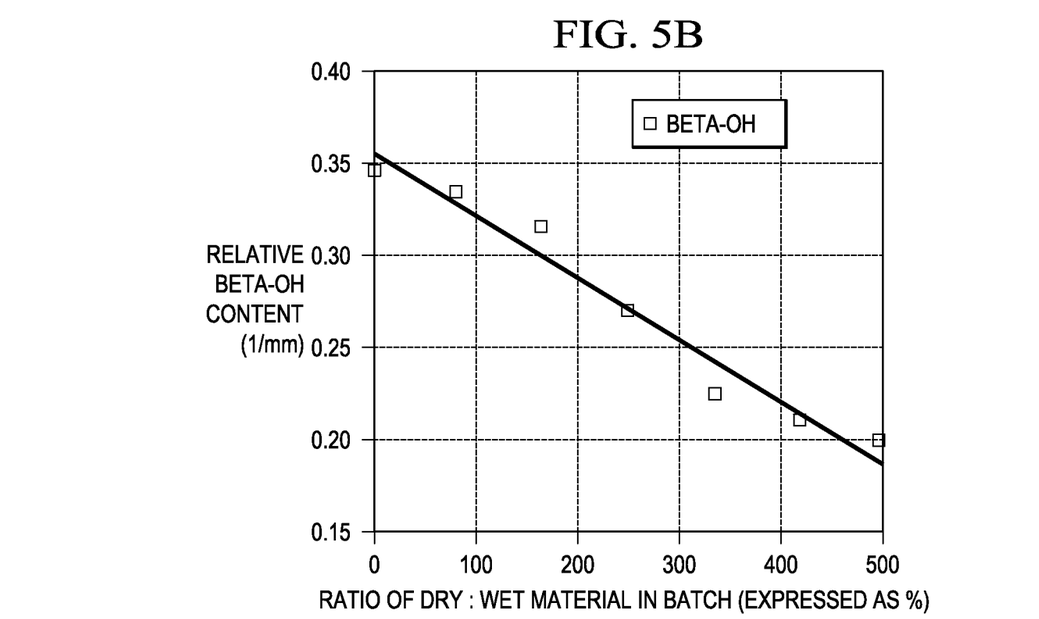

Anhydrous boric acid is a relatively drier material when compared to boric acid. As a result, it was discovered that beta-OH in the glass sheet 102 can be reduced when substituting anhydrous boric acid for all or a portion of the standard boric acid which causes an increase in the annealing point of the glass sheet 102 and which improves compaction and stress relaxation performance. FIG. 5A is a graph which shows the relative impact of changing a dry:wet raw material ratio (i.e., converting boric acid (wet) to anhydrous boric oxide (dry)) in the glass composition 111 of TABLE #3 on the anneal point of the glass sheet 102. FIG. 5B is a graph which shows the relative impact of changing a dry:wet raw material ratio (i.e., converting boric acid, BA (wet) to anhydrous boric oxide (dry)) in the glass composition 111 of TABLE #3 on the beta-OH of the glass sheet 102. With reference to FIGS. 5A and 5B, it can be observed that as the ratio of dry:wet raw material increases in a batch material the anneal point temperature of an exemplary glass composition increases substantially linearly (FIG. 5A), and the relative beta-OH content of an exemplary glass composition decreases substantially linearly (FIG. 5B).

Another example of this concept involves substituting anhydrous boric oxide, also referred to as anhydrous boric acid (ABA) for all or a portion of the standard boric acid used in another glass composition 111 shown in TABLE #4 in wt. %.

TABLE #4

| Oxide | Min | Max | Example |
|---|---|---|---|
| SiO2 | 59 | 68 | 63.6 |
| Al2O3 | 12 | 22 | 16.8 |
| B2O3 | 6 | 12 | 9.4 |
| MgO | 1 | 3 | 1.4 |
| CaO | 4 | 10 | 7.0 |
| SrO | 0.5 | 3.5 | 1.5 |
| SnO2 | 0 | 0.5 | 0.2 |
| Fe2O3 | 0 | 1 | trace |
| ZrO2 | 0 | 1 | trace |

Figure 6A:
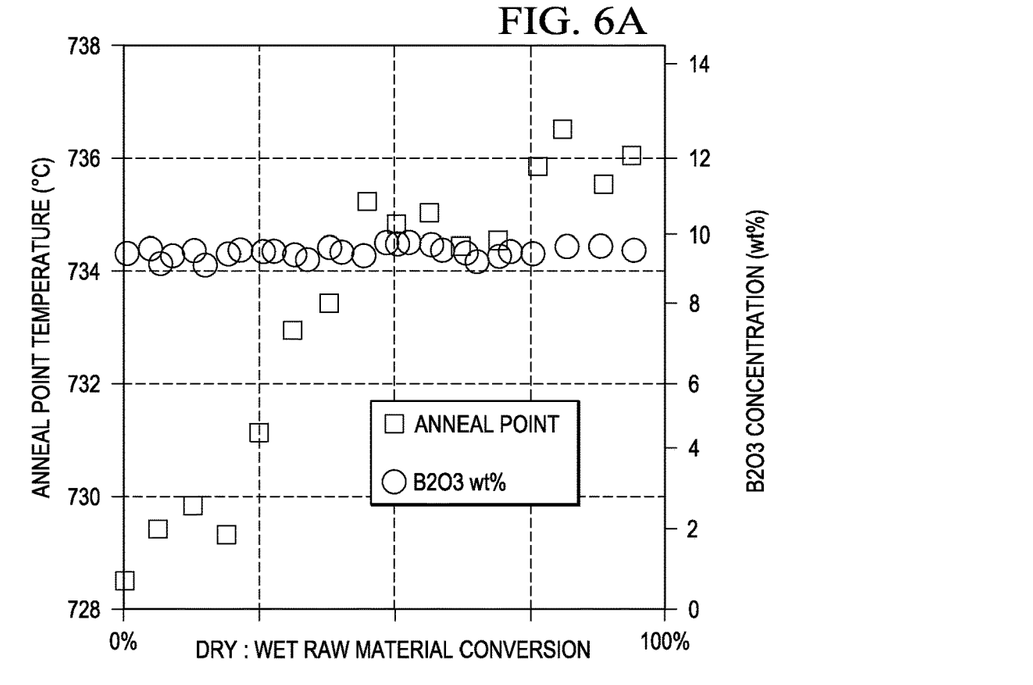
FIGS. 6A-6B are graphs which show experimental effects of changing a dry:wet raw material ratio in another exemplary glass composition.
Figure 6B:
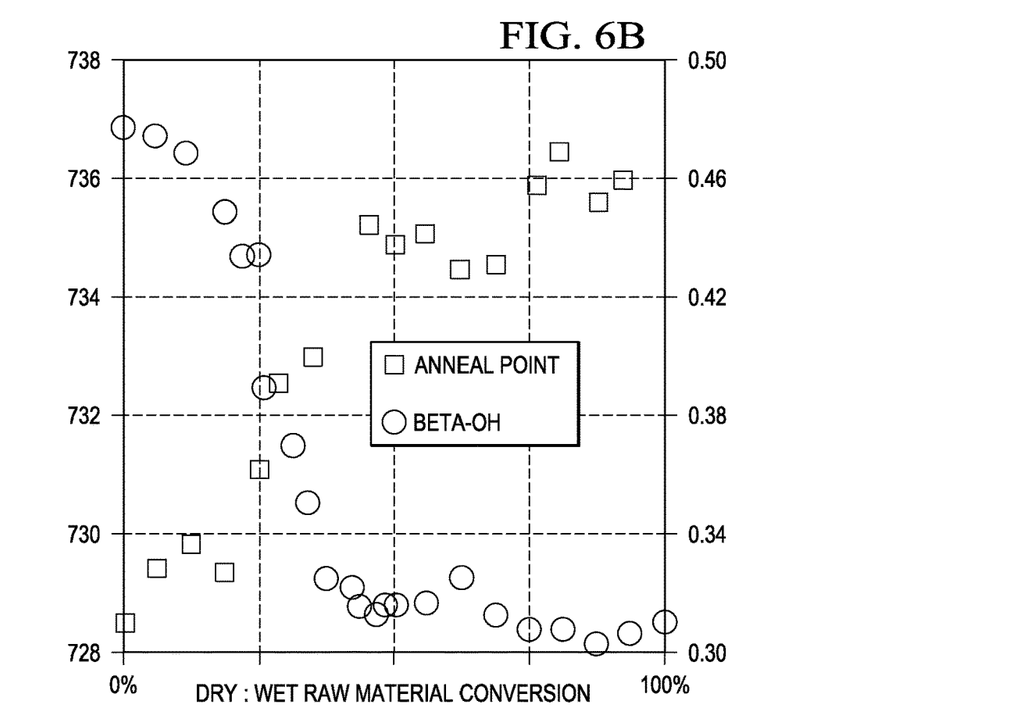

FIG. 6A is a graph which shows the relative impact of changing a dry:wet raw material ratio (i.e., converting boric acid (wet) to anhydrous boric oxide (dry)) in the glass composition 111 of TABLE #4 on the anneal point and the $B_2O_3$ concentration of the glass sheet 102. FIG. 6B is a graph which shows the relative impact of changing a dry:wet raw material ratio (i.e., converting boric acid (wet) to anhydrous boric oxide (dry)) in the glass composition 111 of TABLE #4 on the anneal point and the beta-OH of the glass sheet 102. With reference to FIGS. 6A and 6B, it can be observed that as the ratio of dry:wet raw material increases in a batch material the anneal point temperature of the glass composition of TABLE #4 increases substantially linearly and the B2O3 concentration remains substantially constant (FIG. 6A), and the relative beta-OH content of the exemplary glass composition decreases exponentially to a point and remains substantially constant or decreases slightly thereafter (FIG. 6B).

In view of the foregoing, one skilled in the art will readily appreciate that embodiments described herein relate to methods of selecting raw materials 111 to control the beta-OH of glass to meet a compaction target in glass sheets 102 (display glass sheets 102). It should be noted that while many embodiments have been heretofore described in relation to a fusion draw process and/or manufacturing system, the claims appended herewith should not be so limited as embodiments are equally applicable to other glass manufacturing and forming methods including, but not limited to, float processes and manufacturing systems, slot draw processes and manufacturing systems, double fusion draw processes and manufacturing systems, just to name a few. The present disclosure has many advantages some of which include providing an improved compaction performance, (e.g., when one needs to manufacture display glass sheets 102 (e.g., low temperature polysilicon displays (LTPS) and oxide thin-film-transistor (OxTFT) displays) which require higher dimensional stability at higher process temperatures in the display fabrication process), and providing manufacturing cost reductions (e.g., reduction of beta-OH would relieve current compaction performance constraints on flow capability and allow one to target higher flow capacity designs for a given type of glass sheet 102 which can reduce the cost/ft2 of the glass sheet 102). Additional advantages include compaction variability reductions across a fleet of fusion production lines (see FIG. 4) (e.g., provide an increased ability to supply glass sheets 102 that are transparent to customers (e.g., one production line using a certain glass composition 111 to manufacture one type of glass sheet 102 could be matched to perform like another production which uses a different glass composition 111 to manufacture a different type of glass sheet 102) by the use of drier raw materials in the batch materials 111 either in partial or total substitution). This capability also addresses a problematic issue that can occur when one mixes crates of glass sheets 102 cut down from different mother glass sheets 102 (i.e., the mother glass sheets 102 will now all meet the same compaction target). Further advantages include providing an improved compaction control (e.g., adjusting the ratio of dry and wet raw materials mixture in the batch materials 111 to control the compaction). One could even use a surrogate measurement or combination of measurements instead of compaction directly when implementing the present disclosure assuming the surrogate measurement(s) where sufficiently studied (e.g., anneal point, beta-OH, for a given at a given flow and thickness on a given fusion draw design).

An additional embodiment of the present disclosure relates to the ability to drive to a given anneal point or desired annealing point (and hence compaction performance) by targeting a specific percentage of dry material (e.g., anhydrous boric acid) or specific ratio of dry-to-wet raw material mixture in the batch materials 111. This is a potential means to mitigate product transparency concerns for compaction performance. Thus, a statistical process control (SPC) strategy could be developed in which the anneal point (or beta-OH/anneal point scheme) is actively controlled by continuously adjusting or varying the specific percentage of dry material (e.g., supplied anhydrous boric acid or supplied boric acid) or specific ratio of dry-to-wet raw material mixture in the batch materials 111 and improve an input variable (driver) to reduce compaction variability.

The term "batch materials" and variations thereof are used herein to denote a mixture of glass precursor components which, upon melting, react and/or combine to form a glass. The glass batch materials may be prepared and/or mixed by any known method for combining glass precursor materials. For example, in certain non-limiting embodiments, the glass batch materials can comprise a dry or substantially dry mixture of glass precursor particles, e.g., without any solvent or liquid. In other embodiments, the glass batch materials may be in the form of a slurry, for example, a mixture of glass precursor particles in the presence of a liquid or solvent.

According to various embodiments, the batch materials may comprise glass precursor materials, such as silica, alumina, and various additional oxides, such as boron, magnesium, calcium, sodium, strontium, tin, or titanium oxides. For instance, the glass batch materials may be a mixture of silica and/or alumina with one or more additional oxides. In various embodiments, the glass batch materials comprise from about 45 to about 95 wt % collectively of alumina and/or silica and from about 5 to about 55 wt % collectively of at least one oxide of boron, magnesium, calcium, sodium, strontium, tin, and/or titanium.

The batch materials can be melted according to any method known in the art. For example, the batch materials can be added to a melting vessel and heated to a temperature ranging from about 1100° C. to about 1700° C., such as from about 1200° C. to about 1650° C., from about 1250° C. to about 1600° C., from about 1300° C. to about 1550° C., from about 1350° C. to about 1500° C., or from about 1400° C. to about 1450° C., including all ranges and subranges therebetween. The batch materials may, in certain embodiments, have a residence time in the melting vessel ranging from several minutes to several hours, depending on various variables, such as the operating temperature and the batch size. For example, the residence time may range from about 30 minutes to about 8 hours, from about 1 hour to about 6 hours, from about 2 hours to about 5 hours, or from about 3 hours to about 4 hours, including all ranges and subranges therebetween.

The molten glass can subsequently undergo various additional processing steps, including fining to remove bubbles, and stirring to homogenize the glass melt, to name a few. The molten glass can then be processed to produce a glass ribbon using the forming body apparatuses (e.g., isopipe). For example, as discussed above, the molten glass can be introduced into the trough-shaped portion of the forming body at the delivery end via one or more inlets. The glass can flow in a direction proceeding from the delivery end to the compression end, over two trough walls, and down two opposing outer surfaces of the wedge-shaped portion, converging at the root to form a unitary glass ribbon.

By way of a non-limiting example, the forming body apparatus may be enclosed in a vessel operating at a temperature ranging, at its hottest point (e.g., in an upper "muffle" region proximate the trough-shaped portion), from about 1100° C. to about 1300° C., such as from about 1150° C. to about 1250° C., from about 1150° C. to about 1225° C., or from about 1175° C. to about 1200° C., including all ranges and subranges therebetween. At its coolest point (e.g., in a lower "transition" region proximate the root of the forming body), the vessel may operate at a temperature ranging from about 800° C. to about 1150° C., such as from about 850° C. to about 1100° C., from about 900° C. to about 1050° C., or from about 950° C. to about 1000° C., including all ranges and subranges therebetween. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a component" includes examples having two or more such components unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. Moreover, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an appartus consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A glass production method comprising:
   selecting a first quantity of raw materials, the first quantity of raw materials comprising an anhydrous boric acid and a boric acid, the first quantity of raw materials defining a first ratio of the anhydrous boric acid to the boric acid;

producing a first quantity of molten glass by melting the first quantity of raw materials in a vessel;
producing a first glass sheet from the first quantity of molten glass;
comparing a measured compaction of the first glass sheet with a compaction target;
determining, based on the measured compaction comparison and based on the first ratio, a second ratio of the anhydrous boric acid to the boric acid for a second quantity of raw materials, the second ratio being different than the first ratio;
producing a second quantity of molten glass by melting the second quantity of raw materials in the vessel, the second quantity of raw materials comprising the anhydrous boric acid and the boric acid, the second quantity of raw materials defining the determined second ratio of the anhydrous boric acid to the boric acid; and
producing a second glass sheet from the second quantity of molten glass.

2. The glass production method of claim 1, wherein the compaction is measured using an annealing point, such that the second ratio is determined based on a comparison of a measured annealing point of the first glass sheet and a desired annealing point of the first glass sheet.

3. The glass production method of claim 1, comprising:
continuously producing molten glass by continuously supplying the anhydrous boric acid and the boric acid to the vessel;
continuously producing glass sheets from the molten glass; and
actively controlling a compaction of the glass sheets by continuously varying a ratio of the supplied anhydrous boric acid to the supplied boric acid.

4. The glass production method of claim 3, comprising continuously varying the ratio of the supplied anhydrous boric acid to the supplied boric acid based on measured annealing points of the glass sheets.

5. The glass production method of claim 1, comprising determining the second ratio based on a magnitude of disparity between the measured compaction and the compaction target.

6. The glass production method of claim 1, wherein the first and second quantities of raw materials each comprise a dry silicon dioxide and a wet silicon dioxide, the first quantity of raw materials defining a third ratio of the dry silicon dioxide to the wet silicon dioxide, the dry silicon dioxide having a lower water content than the wet silicon dioxide.

7. The glass production method of claim 6, comprising determining, based on the compaction comparison and based on the third ratio, a fourth ratio of the dry silicon dioxide to the wet silicon dioxide; and
wherein the second quantity of raw materials comprises the dry and the wet silicon dioxides and defines the fourth ratio of the dry silicon dioxide to the wet silicon dioxide.

8. The glass production method of claim 1, wherein a controller comprising one or more processors is configured to:
compare the measured compaction of the first glass sheet with the compaction target; and
determine the second ratio based on the compaction comparison and the first ratio, the method comprising:
using the controller to compare the measured compaction of the first glass sheet with the compaction target; and
using the controller to determine the second ratio based on the compaction comparison and the first ratio.

9. The glass production method of claim 1, comprising:
continuously producing molten glass by continuously supplying the anhydrous boric acid and the boric acid to the vessel;
continuously producing glass sheets from the molten glass; and
using a controller comprising one or more processors to actively control a compaction of the glass sheets by continuously varying a ratio of the supplied anhydrous boric acid to the supplied boric acid.

10. The glass production method of claim 9, wherein the compaction is measured using an annealing point.

11. The glass production method of claim 9, wherein the controller is configured to:
determine a first water content of the first quantity of molten glass; and
determine the second ratio of the anhydrous boric acid to the boric acid based on the first water content, the measured compaction of the first glass sheet, the compaction target, and the first ratio of the anhydrous boric acid to the boric acid.

* * * * *